June 8, 1965  J. B. WILEY  3,188,505
DYNAMOELECTRIC MACHINE MEANS
Filed Nov. 18, 1960  5 Sheets-Sheet 1

INVENTOR.
John B. Wiley
BY
Albert H. Reuther
His Attorney

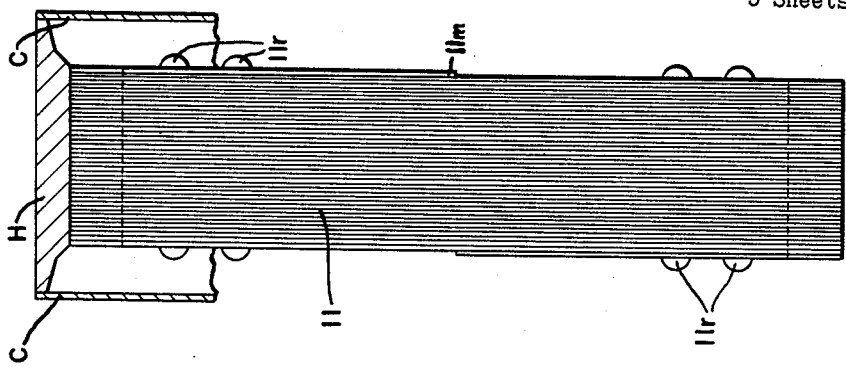
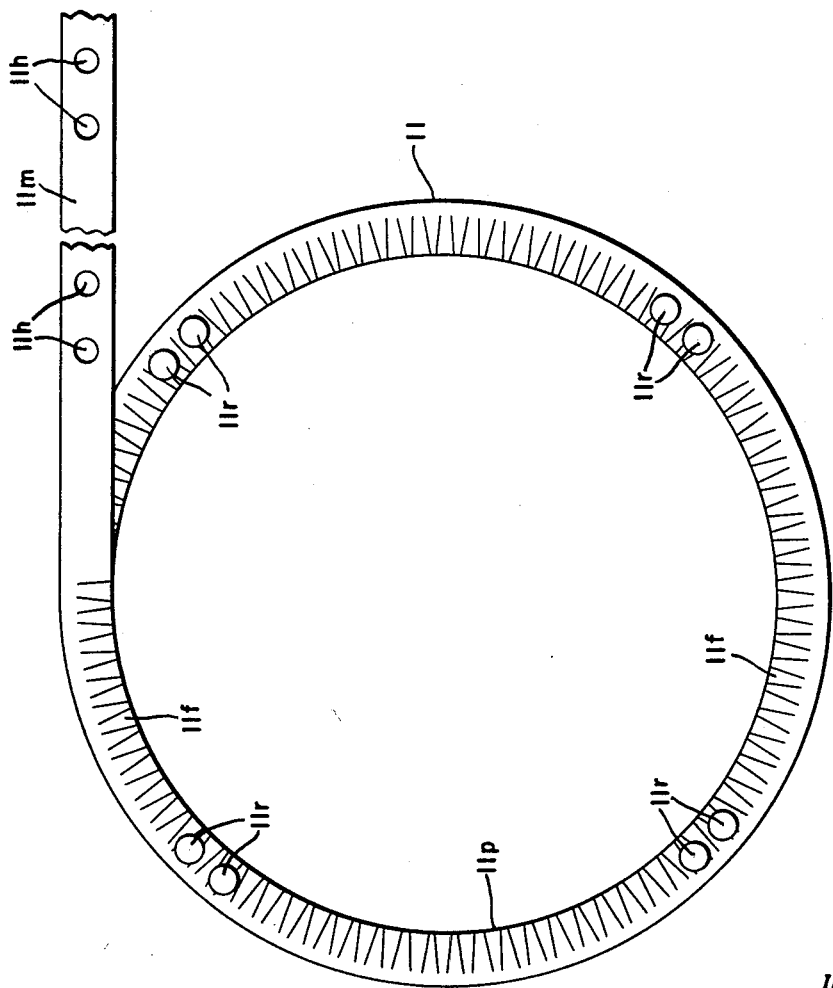

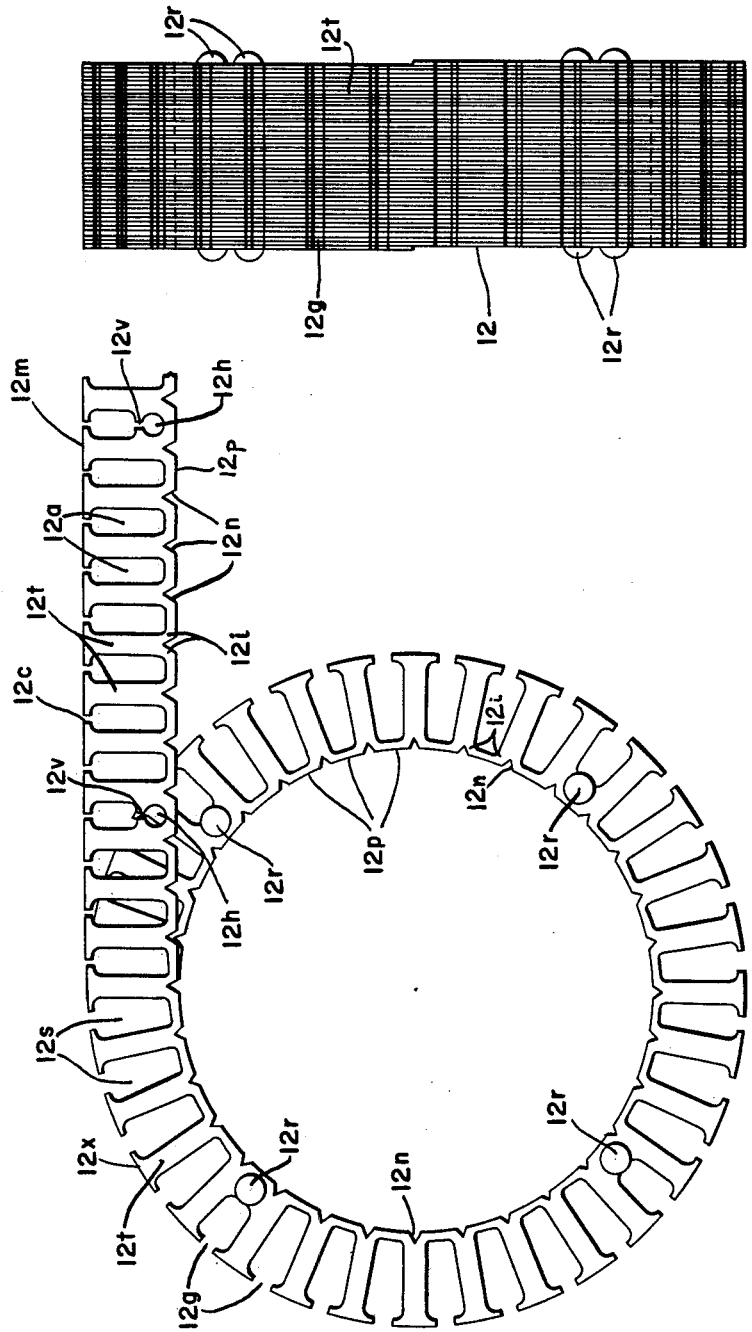

INVENTOR.
John B. Wiley

June 8, 1965   J. B. WILEY   3,188,505
DYNAMOELECTRIC MACHINE MEANS
Filed Nov. 18, 1960   5 Sheets-Sheet 5

INVENTOR.
John B. Wiley
BY
His Attorney

United States Patent Office 3,188,505
Patented June 8, 1965

3,188,505
DYNAMOELECTRIC MACHINE MEANS
John B. Wiley, St. Catharines, Ontario, Canada, assignor to General Motors Corporation, Detroit, Mich., a corporation of Delaware
Filed Nov. 18, 1960, Ser. No. 70,262
4 Claims. (Cl. 310—259)

This invention relates to dynamoelectric machine means, and, more particularly, to layered formation of components thereof.

An object of this invention is to provide a new and improved structural arrangement for stator and rotor components of dynamoelectric machines wherein a saving in laminating material is realized together with standardization of laminating material useful both of inside-out arrangement of stator and rotor components and vice versa in outer stator with central rotor arrangement thereof.

Another object of this invention is to provide dynamoelectric machine stator and rotor lamination structures each involving a laterally slotted longitudinal strip which is notched in locations intermediate the slots which become substantially longitudinally aligned to each other in predetermined numbers upon assembly to an annular member as a mounting therewith, the slots having winding means therein.

Another object of this invention is to provide dynamoelectric machine stator and rotor lamination structures each including an annular support as well as slotted lamination means press-fitted thereto, the lamination means having a body portion arcuate in configuration as bent from a continuous strip having a plurality of slots initially small in area to save waste of material and then enlarged as to slot area when teeth defining the slots are caused to spread from each other adjacent to free radially outer ends while notches along radially inner edging in alignment with slots and intermediate the teeth facilitate bending and simultaneously provide a reluctance air gap free of open slots from which windings can dislocate because identical strip material can be used both for stator and rotor structures and windings tend to push into depth of the slots rather than out of any inner opening of the laminated configuration.

A further object of this invention is to provide a dynamoelectric machine component such as a rotor for an inside-out motor as well as an external stator for a central rotor arrangement of a motor including dual spiral portions one of which is an outer solid arcuately bent strip to form a metal core concentrically outside an inner slotted portion bent to fit tightly though replaceable for servicing inside the core, the inner slotted portion having windings in slots of enlarged area between teeth which originally were close together and then spread during increase of initial small slot area to larger area but leaving substantially twenty percent less scrap, the slot openings being closed off by the outer spiral core so as to assure retention of windings therebetween which cannot become dislocated from the slots by any movement radially inwardly since the slots are closed off along a radially inner periphery of the strip formed into the inner portion.

Another object of this invention is to provide a dynamoelectric machine component such as a rotor to be centrally located on a motor as well as a stator for an inside-out motor including an annular support or continuous central portion resembling a pulley or rim of a wheel over the outer periphery of which a slotted spiral portion is press-fitted and carries winding means, the slots having optional skew while in any event the winding means holds slotted strip material together and the continuous support or central portion can have the outer periphery thereof rough and free of machining and finishing.

Further objects and advantages of the present invention will be apparent from the following description, reference being had to the accompanying drawings wherein preferred embodiments of the present invention are clearly shown.

In the drawings:

FIGURES 2 and 3 are elevational and end views respectively of one portion of one of the components in FIGURE 1.

FIGURES 4 and 5 are elevational and end views respectively of another portion of the same component.

Figure 1:
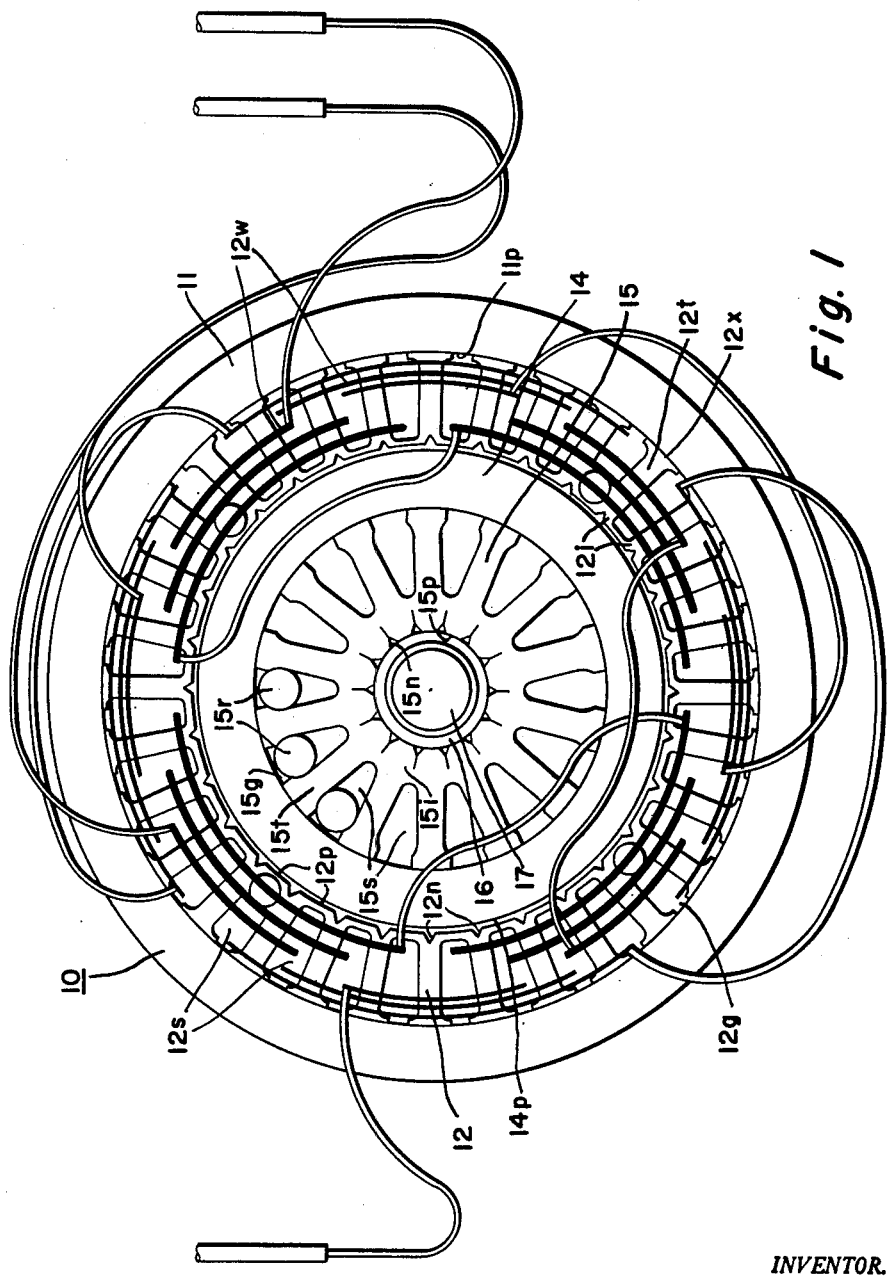
FIGURE 1 is an elevational view of dynamoelectric machine components in accordance with the present invention.

FIGURE 1 illustrates a dynamoelectric machine generally indicated by numeral 10 including stator and rotor components adapted to be mounted inside a housing (not shown). Structural arrangement of these components is such that each thereof can be used equally well both for inside-out as well as for central rotor arrangement of motors or generators for example. In the dynamoelectric machine 10 there is an outer annular component having both a core portion 11 as well as a slotted strip portion 12 assembled thereto in accordance with the present invention. The dynamoelectric machine 10 further includes an inner component having a radially outer metal band portion 14 surrounding a radially inner strip portion 15 carried by a solid sleeve or cylindrical bearing member 16 journalled on a shaft 17.

FIGURES 2 and 3 illustrate the core portion 11 in further detail. This core portion 11 is formed from a straight continuous strip of sheet metal indicated by reference numeral 11m and having predetermined holes 11h punched therethrough at predetermined intervals such that the metal strip 11m can be bent into a generally spiral and arcuate configuration including a plurality of flutes 11f that extend generally radially for at least one-half the width of the metal strip and that become nested progressively as the strip material 11m is continuously bent into a predetermined stack-up illustrated by FIGURE 3. Suitable fastening means such as rivets 11r can be inserted through holes such as 11h and serve to hold the core portion 11 in an arcuate subassembly of the outer component of the dynamoelectric machine 10 in accordance with the present invention. A cast housing portion H including a pair of covers C carried by opposite ends thereof can be provided for mounting of the core portion 11 and dynamoelectric machine components in accordance with the present invention. It is to be understood that the end covers C can be provided with central hubs for journalling opposite ends of shaft 17 on which the inner member or component including portions 14 and 15 can be mounted. As illustrated in FIGURE 3, the core portion 11 can be press-fitted to the housing portion H so as to be retained concentrically therein.

In accordance with the present invention, the slotted strip portion 12 is further made of arcuately bent strip material prepunched in predetermined longitudinal sequence to define a plurality of metal teeth 12t each located between a pair of laterally open apertures 12a. Each of the teeth 12t has a notch 12n formed substantially in lateral alignment therewith in locations intermediate pairs of apertures 12a. Periodically an aperture such as 12a is made to have slightly less width or depth so as to permit formation of holes such as 12h through which rivets 12r can be secured for fastening the slotted portion 12 into an arcuate subassembly adapted to be press-fitted into engagement with a radially inner periphery 11p of the core portion 11. The apertures 12a as well as the notches 12n and holes 12h are punched into a continuous longitudinally extending metal band 12m of relatively ductile material such as silicon steel made readily bendable by provision of the notches 12n which are in alignment with each of the teeth 12t. It is to be understood that strip material of the band 12m between the notches 12n forms a radially inner periphery 12p composed of a plurality of segments or sections designated collectively by reference numerals 12p. Each of these peripheral segments 12p is joined at opposite ends by an intermediate segment 12i that serves as a bendable hinge such that the apertures 12a as originally punched can have a smaller area than slots 12s. The slots 12s are larger in area due to angular separation of transversely extending ends 12x of each of the teeth 12t. Initial end cuts 12c adjacent to one side of each of the apertures 12a can expand into relatively larger gaps 12g through which winding means 12w shown in FIGURE 1 can be inserted. These winding means 12w can include a plurality of concentric coils fitted into predetermined locations in the slots 12s and it is emphasized that the gaps 12g become closed over when the slotted portion 12 is press-fitted peripherally inside the core portion 11. It is to be noted further that the slotted portion 12 together with the winding means 12w carried thereby can be readily replaced for servicing by separation of the dual annular portions 11 and 12 of the radially outer component of the dynamoelectric machine 10. Due to the fact that the apertures 12a have a smaller area than the slots 12s which result from arcuate bending of the strip material, there is appreciably less scrap in some instances up to twenty percent less scrap metal than would be encountered if the slots were formed by a more conventional lamination structure. Furthermore by having the gaps 12g along a radially outer location of the slotted portion 12 there is realized a further saving in material than would result by having the gaps in a radially inner position. When the gaps are in a radially inner position there are several disadvantages including the matter of additional scrap material. The reason for additional scrap material and waste encountered by having the gaps in a radially inner position even when bending a longitudinal metal strip into an arcuate spiral is that apertures such as 12a and cuts 12c must be made initially larger to permit arcuate bending of the strip material so as to make the slots such as 12s smaller. Such smaller slots are undesirable not only from the material standpoint but also so far as efficient placement and spacing of winding means is concerned. Furthermore, when the gaps such as 12g are along a radially inner periphery there can be no radially inner closure of the slots as provided by the peripheral segments 12p collectively in accordance with the present invention. Once the strip material is bent into an arcuate subassembly joined by rivets 12r, the notches 12n have a substantially V-shape less in width but retaining substantially the same depth laterally into each of the teeth 12t so as to increase reluctance in notch locations due to increase of air gaps in alignment with the notches relative to the inner component. These air gaps in alignment with the notches 12n are greater than the air gap between peripheral segments 12p relative to an outer periphery of the inner component. To assure even arcuate bending of the strip material 12m throughout the length thereof including locations where the holes 12h for the rivets 12r are located, there is provided a lateral slit or void 12v thereby permitting the cuts 12c to be expanded uniformly into larger gaps 12g as indicated earlier.

Figure 7:
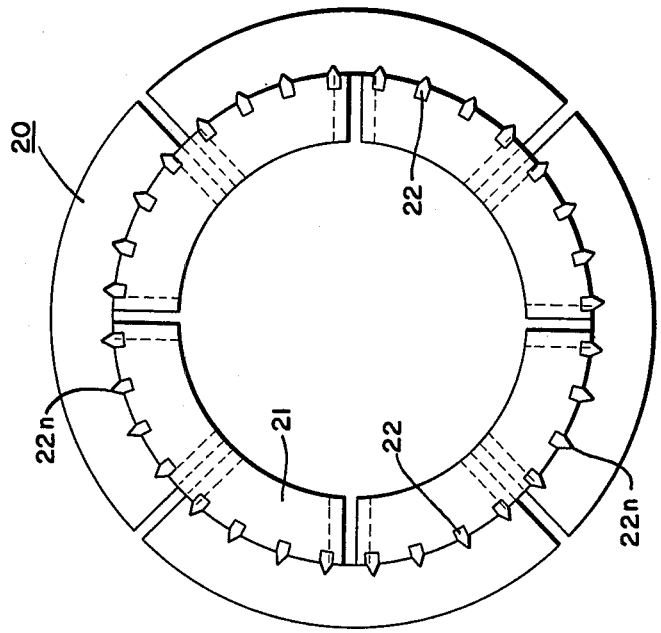
FIGURES 6 and 7 are elevational and end views respectively of an arbor used during formation of the portion of FIGURES 4 and 5.
Figure 6:
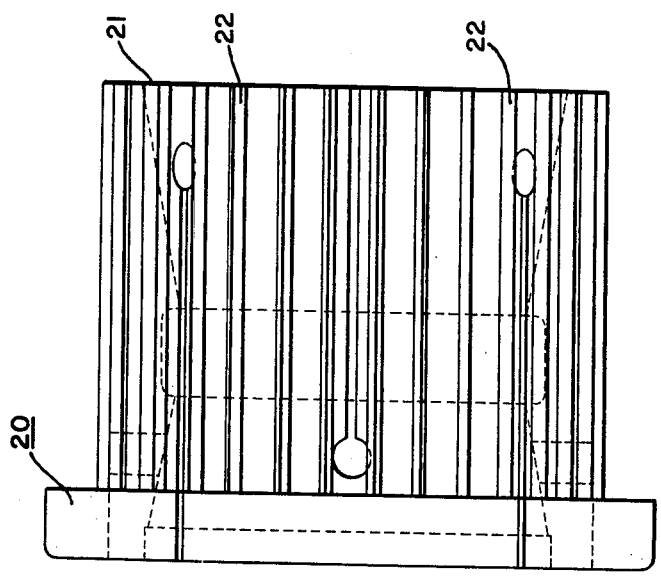

FIGURES 6 and 7 illustrate an arbor generally indicated by numeral 20 including a substantially cylindrical body portion 21 having a plurality of splines or keys 22 secured to an outer periphery thereof. These splines or keys have pointed ends 22n best seen in FIGURE 7 and adapted to complement the notches 12n of the metal band 12m. The arbor or tool 20 can be mounted on a lathe-like means to effect turning and spiralling of the slotted portion 12 so as to have slots such as 12s substantially in longitudinal alignment with each other. However it is to be understood that the slots 12s can also be formed to have a skew or angular relation to a central axis of the angular portion. Various modifications in tooling can be provided for forming dynamoelectric machine components and portions thereof in accordance with the present invention. The arbor means 20 is shown merely to illustrate one way of forming one of the portions for the dynamoelectric machine 10 in accordance with the present invention. Differing diameters of cylindrical body portions such as 21 must be provided for formation of differing portions of the components in accordance with the machine of the present invention. It is to be understood that the portions 11 and 12 of the outer component described above can be used either as a rotor for an inside-out motor or generator or as a stator for use around a central rotor journalling arrangement of a motor or generator. Further it is to be understood that the core portion can be made of a solid annular member including sintered metal pressed into an annulus to provide a magnetic path for flux surrounding the winding means 12w. The winding means 12w can also be made of cast metal, for instance, when the outer component including portions 11 and 12 is to be a rotor of an inside-out dynamoelectric machine used to power a ventilating fan for example.

Referring again to FIGURE 1, the inner component includes a core portion 14 that can be an annular metal casting, a sintered metal annulus or again a spiral banding of metal strip similar to 11m and also having flutes and fastening holes except for a smaller over-all diameter thereof. When a metal strip such as 11m is used for the inner component also it is apparent that there is a first standardization of the inner and outer components including use of only a longitudinal metal strip or band which is formed into a core portion identical in all respects except for diameter so as to be concentrically spaceable relative to each other. It is to be noted that the flutes such as 11f when provided on the core portion 14 will also extend radially for at least one half the width of the strip material but that the flutes will again be located radially inwardly such that a substantially smooth outer periphery 14p is formed separated by a predetermined air gap from the peripheral portions 12p which collectively provide a radially outwardly magnetic material surrounding the core portion 14. The core portion 14 is press-fitted over an outer periphery of the slotted strip portion 15 that has teeth 15t identical to the teeth 12t and that provides slots 15s larger in area that apertures of a flat and continuous longitudinal strip of metal from which the portion 15 is formed. In the embodiment illustrated by FIGURE 1, the strip material such as 12m is identical to that used to form both the slotted portion 12 as well as the inner slotted portion 15. The only difference being that the diameters are different and thus there is a further standardization of the metal materials usable for making inner and outer components for a dynamoelectric machine in accordance with the present invention. Both the metal strips 11m and 12m can be used identically for forming inner and outer components except for difference in diameter. It is to be noted that the inner strip portion 15 is provided with notches designated by numeral 15n substantially in radial alignment with teeth 15t forming the slots 15s open at gaps 15g which can be closed off by press-fit of the inner strip portion 15 along an inner periphery of the inner core portion 14. The solid bearing means or solid yoke or sleeve 16 provides a mounting relative to shaft 17. The sleeve or yoke 16 can be press-fitted along an inner periphery of the inner strip portion 15. It is to be understood that again the slots 15s can be longitudinally in alignment with each other or can be skewed as desired. Actual coil windings can be fitted into the slots 15s or a plurality of rods such as 15r can be pressed into the longitudinally aligned or skewed slots. Ends of these rods 15r can be swaged or peened over as well as joined by cast metal end rings when actual coil windings are not used for the inner strip portion 15 having the slots 15s. In the event coil windings are provided for the inner strip portion slots 15s, then suitable interconnecting leads can be provided similar to interconnecting leads outlined for the windings such as 12w in FIGURE 1. For the inner component including the core portion 14 and inner slotted portion 15 it is again apparent that the gaps 15g are closed off by the core portion 14 similar to the closing off gaps 12g by the core portion 11. Thus the winding means in these slots 15s will be retained even against dislocation due to centrifugal forces acting radially outwardly on the windings. The slots 15s again increase in area from initial apertures such as 12a of the strip material from which the inner strip portion 15 can be formed and there is a commensurate saving of material. The notches 15n permit close-in and marking of the strip material that has intermediate hinge like segments 15i located between each of the teeth and an inner periphery 15p of the inner strip portion 15. The portions 11 and 12 as well as portions 14 and 15 have a press-fitted juncture between each thereof. It is apparent that the strip portions 12 and 15 can be more easily fitted with windings because wire can be packed radially inwardly from the outer gaps 12g and 15g. This radially inward packing or fitting of wire into windings permits use of wire winding machines and facilitates automation and operation thereof. Any coils or wiring fitted into such slots as 12s and 15s tends to push itself deeper into the slots rather than out of the previously known radially inner openings or gaps of other lamination structures. Feeding of longitudinal strip material can be automated by any suitable means and preferably one notch cooperable with a spline or key such as 22 can be provided for each tooth provided between predetermined numbers of slots of inner and outer components of a dynamoelectric machine in accordance with the present invention. The separable outer annular ring means or core portions 11 and 14 can form an outer periphery of either a rotor or stator for a dynamoelectric machine.

In any event, the ends such as 12x of the teeth 12t and the like are caused to spread from each other adjacent to free radially outer ends of the teeth while notches along radially inner edging in alignment with slots and intermediate the teeth facilitate bending and simultaneously provide a reluctance air gap free of open slots from which windings can dislocate. Identical strip material for at least one of each of dual spiralled portions can be used both for stator and rotor structures.

Figure 9:
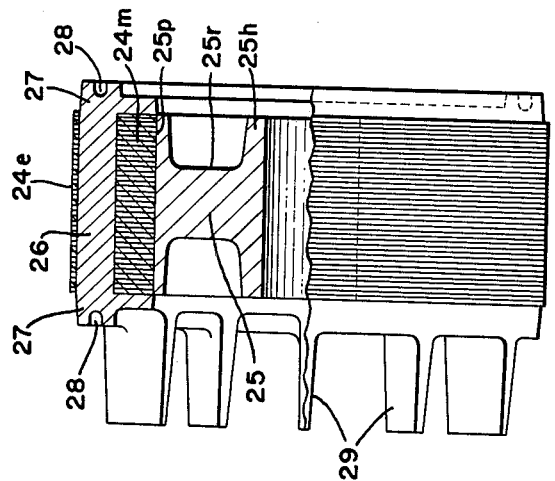
FIGURES 8 and 9 are elevational and end views respectively of an alternate form of the inner component for use in the machine of FIGURE 1.
Figure 8:
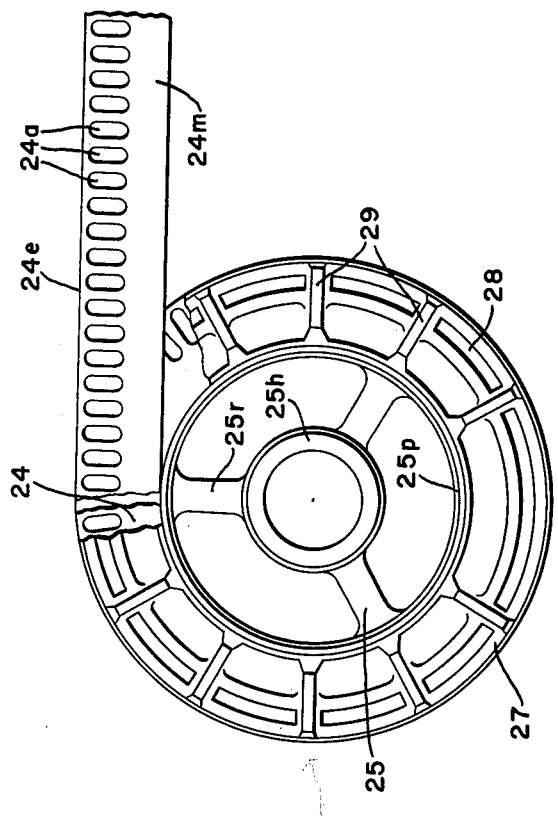

FIGURES 8 and 9 illustrate an alternative structure for the inner component to include a slotted portion 24 and a pulley-like central portion 25. The annular central portion 25 includes a hub 25h that can be journalled directly on a shaft such as 17 and radial spokes 25r join the hub 25h to an annular peripheral portion 25p over which a spiralled laminating means 24m is press-fitted in a stack-up formed from a solid longitudinal strip of metal projecting from one side of the view of structure in FIGURE 8. In this embodiment the metal strip 24m has a plurality of elliptical slots for apertures 24a therein and folds (not shown) similar to flutes such as 11f shown in FIGURE 2 can be formed during bending of the strip of metal into a spiral lamination portion. A continuous edge 24e can remain intact such that the apertures 24a do not become slots open along one side and a cast metal winding including conductor bars 26 as well as opposite shorting end rings 27 can be cast directly in place relative to the spiral stacking of the continuous metal strip. Balancing grooves 28 can be formed with these end turns 27 and axially projecting radial fan blades 29 can also be cast integral with at least one of the end rings 27.

In the embodiment of either component having a slotted portion including slots such as 12s or 15s it would also be possible to cast metal as winding means into these slots and to have a continuous support or annular member close off the slot gaps as mentioned earlier so as to keep molten material such as aluminum from leaking out of a predetermined mold shape to form the cast winding means including suitable end turns or end rings therefor.

A dynamoelectric machine having structure in accordance with the present invention could be used as a generator on motor vehicles. In such an embodiment the portions such as 14 and 15 would form a rotor and the radially outer portions 11 and 12 would provide a stator having suitable windings fitted into slots 12s thereof. Each of the portions such as 11, 12, 14, and 15 can have spiralled strip material formed into an "anguilloid" configuration to provide structural components in accordance with the present invention. It should also be noted that the dynamoelectric machine in accordance with the present invention can be used on appliances such as on a furnace heater or blower motor.

While the embodiments of the present invention herein described constitute preferred forms, it is to be understood that other forms might be adopted.

What is claimed is as follows:

1. Dynamoelectric machine stator and rotor lamination structural means, each comprising an annular portion having a continuous periphery as well as a slotted portion press-fitted thereto, the slotted portion having a metal body arcuate in configuration as bent from a continuous strip of metal having a plurality of slots initially small in area to save waste of material and then enlarged as to slot area when teeth defining the slots are caused to spread from each other adjacent to free radially outer ends while notches along radially inner edging in alignment with slots and intermediate thin hinge segments joining said teeth facilitate bending, said slotted portion having said hinge segments and inner edging with notches directly press-fitted onto said continuous periphery of said annular portion.

2. The structural means of claim 1 wherein both said slotted portion and said annular portion are strips of metal spiralled into predetermined differing diameters to be concentrically mounted in press-fitted engagement with each other regardless of roughness and elimination of machining of surface edging therebetween including said hinge segments and notches of said slotted portion.

3. The structural means of claim 1 wherein the slots are closed off by said annular portion in radially outer locations and said intermediate thin hinge segments have locations laterally on opposite sides of notches and substantially radially adjacent to said teeth both to facilitate spiral formation and to close off radially inner locations of said slots.

4. A dynamoelectric machine structural means such as a rotor for an inside-out motor as well as a stator for a vice-versa arranged motor, comprising dual spiral portions one of which is an outer solid arcuately bent strip to form a metal core, an inner slotted strip bent arcuately to fit concentrically inside said outer strip and having slots of enlarged area between teeth which originally were close together and then spread apart radially during increase of initial small slot area to larger area though leaving substantially twenty percent less scrap, the slot openings of said inner spiral portion being closed off by said outer spiral portion, an inner periphery of said inner strip having said teeth joined integrally to thinned hinge segments intermediate V-shaped notches radially in alignment with teeth that define the slots, said notches being arbor engageable positively during spiral formation of said inner strip to effect radially outer spread of free teeth ends to increase slot area and simultaneously deformable at said thinned hinge segments along inner periphery between the notches where the slots are always closed against displacement of winding means therefrom as well as to provide intermittent radial variation in reluctance though air gap is free of open slots.

References Cited by the Examiner

UNITED STATES PATENTS

| | | | |
|---|---|---|---|
| 356,902 | 2/87 | Thomson. | |
| 1,920,155 | 7/33 | Fisher | 310—216 X |
| 1,920,354 | 8/33 | Carpenter. | |
| 2,187,033 | 1/40 | Hubacker | 310—86 |
| 2,445,986 | 7/48 | Adamson | 310—42 |
| 2,630,463 | 3/53 | Smith | 310—214 X |
| 2,695,969 | 11/54 | Yates | 310—259 |

MILTON O. HIRSHFIELD, *Primary Examiner.*